US010147925B2

(12) United States Patent
Tsunaki et al.

(10) Patent No.: US 10,147,925 B2
(45) Date of Patent: Dec. 4, 2018

(54) SQUARE SECONDARY BATTERY

(71) Applicant: Hitachi Automotive Systems, Ltd., Hitachinaka-shi, Ibaraki (JP)

(72) Inventors: Takuro Tsunaki, Hitachinaka (JP); Masaaki Iwasa, Hitachinaka (JP); Kazuaki Urano, Hitachinaka (JP); Sho Saimaru, Hitachinaka (JP); Sho Matsumoto, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 204 days.

(21) Appl. No.: 14/419,411

(22) PCT Filed: Sep. 28, 2012

(86) PCT No.: PCT/JP2012/075177
§ 371 (c)(1),
(2) Date: Feb. 3, 2015

(87) PCT Pub. No.: WO2014/049855
PCT Pub. Date: Apr. 3, 2014

(65) Prior Publication Data
US 2015/0207128 A1 Jul. 23, 2015

(51) Int. Cl.
*H01M 2/00* (2006.01)
*H01M 2/20* (2006.01)
(Continued)

(52) U.S. Cl.
CPC ............. *H01M 2/206* (2013.01); *H01M 2/06* (2013.01); *H01M 2/305* (2013.01);
(Continued)

(58) Field of Classification Search
CPC .... H01M 2/0217; H01M 2/0473; H01M 2/06; H01M 10/0413; H01M 10/0587;
(Continued)

(56) References Cited

U.S. PATENT DOCUMENTS

2011/0281155 A1* 11/2011 Ito ...................... H01M 2/0473
429/179
2012/0058374 A1 3/2012 Aota et al.

FOREIGN PATENT DOCUMENTS

JP 2003-092103 A 3/2003
JP 2004-014173 A 1/2004
(Continued)

*Primary Examiner* — Nicholas P D'Aniello
(74) *Attorney, Agent, or Firm* — Volpe and Koenig, P.C.

(57) ABSTRACT

A square secondary battery includes a generating element having an electrode; a battery can holding the generating element; a battery lid that seals an opening of the battery can; an external terminal arranged on the battery lid; and a current collector connecting the electrode of the generating element to the external terminal. The external terminal has a bus bar joint to which a bus bar is connected and a current collector joint to which the current collector is connected, the bus bar joint and the current collector joint being integrally juxtaposed on the battery lid. The current collector joint has a cylindrical insertion part to be inserted into a through hole in the battery lid and also has a sealing part arranged at an outer periphery of the insertion part, the sealing part pressing down a sealing member.

4 Claims, 14 Drawing Sheets

(51) Int. Cl.
   *H01M 2/06*   (2006.01)
   *H01M 2/30*   (2006.01)
   *H01M 10/04*  (2006.01)
   *H01M 2/02*       (2006.01)
   *H01M 10/0587*    (2010.01)
   *H01M 2/04*       (2006.01)

(52) U.S. Cl.
   CPC ........ *H01M 10/0413* (2013.01); *H01M 2/024* (2013.01); *H01M 2/0217* (2013.01); *H01M 2/043* (2013.01); *H01M 10/0587* (2013.01); *H01M 2220/20* (2013.01)

(58) Field of Classification Search
   CPC .... H01M 2/0486; H01M 2/206; H01M 2/305; H01M 2/043; H01M 2/024; H01M 2220/20
   See application file for complete search history.

(56) References Cited

FOREIGN PATENT DOCUMENTS

| | | |
|---|---|---|
| JP | 2008-305646 A | 12/2008 |
| JP | 2012-004105 A | 1/2012 |
| JP | 2012-033395 A | 2/2012 |
| JP | 2012-138342 A | 7/2012 |

\* cited by examiner

F I G . 4
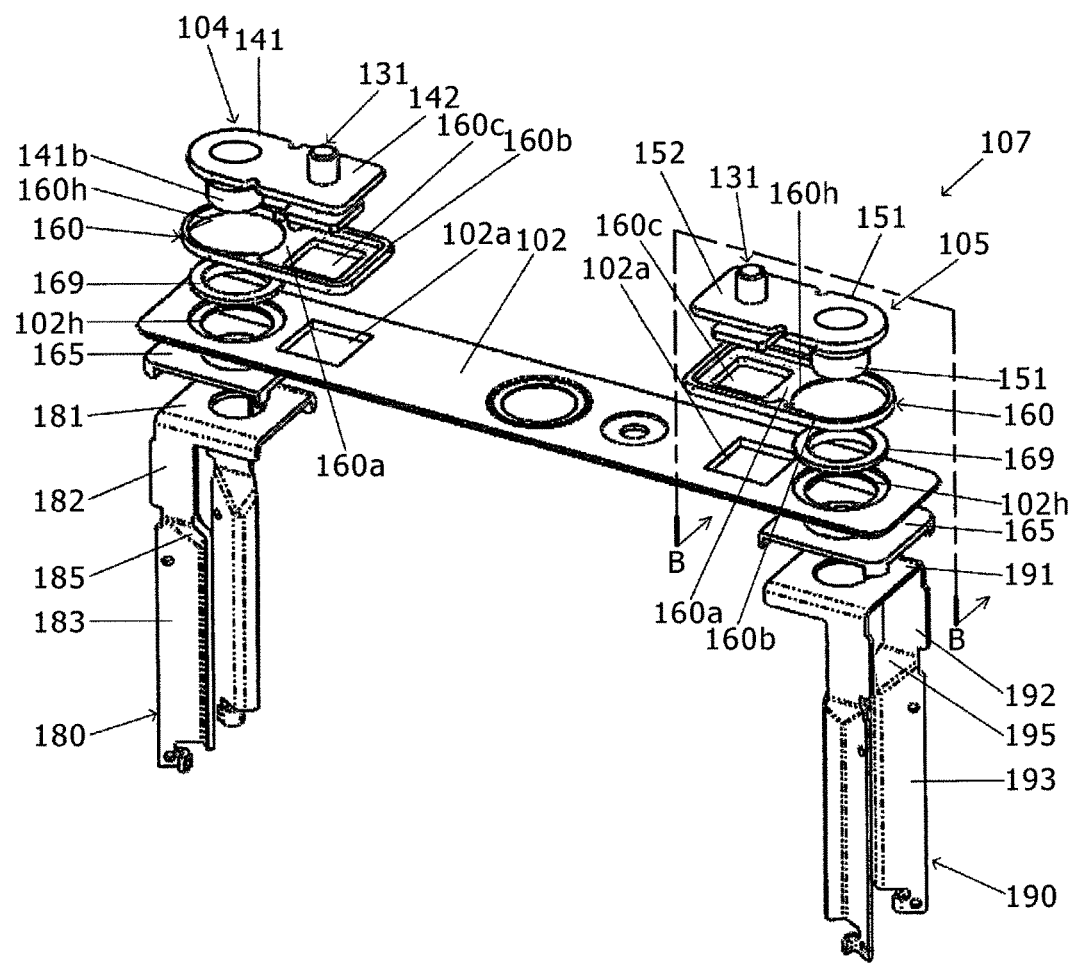

(a)

(b)

(a)

(b)

(a)

(b) SECTIONAL VIEW TAKEN ALONG THE LINE H-H

SQUARE SECONDARY BATTERY

TECHNICAL FIELD

The present invention relates to a square secondary battery.

BACKGROUND ART

There has been a marked trend toward development in secondary batteries of high capacity (Wh) to be used as the power source of hybrid or pure electric motorcars. Noticeable among them are lithium ion secondary batteries of square type with a high energy density (Wh/kg).

The lithium ion secondary battery of a square type has a generating element including flat wound electrodes formed by winding a positive electrode consisting of a positive electrode foil and a positive electrode active material coated thereon, a negative electrode consisting of a negative electrode foil and a negative electrode active material coated thereon, and a separator for insulation between them one over another in multiple layers. The wound electrodes are electrically connected to the positive and negative electrode terminals which are formed on the lid of the battery container. Moreover, the wound electrodes are held in the battery can of the battery container, with the battery can having its opening sealed by the battery lid welded thereto. The square secondary battery is completed by filling with an electrolyte poured through the inlet of the battery container holding the wound electrodes and subsequently by closing the inlet with a stopper inserted therein and sealing the inlet by means of laser welding.

A multiplicity of square secondary batteries are formed into a battery pack by electrically connecting the positive and negative electrodes of individual units through conducting members such as bus bars. The bus bar is screwed with bolts and nuts or welded to the external terminals of the square secondary battery.

Patent Document 1 discloses a secondary battery having external terminals capable of connection to the bus bar with bolts and nuts. The secondary battery disclosed in Patent Document 1 includes a current collector connected to the generating element, a rivet terminal to electrically connect the current collector to the terminal base arranged on the battery lid, and a terminal base having formed therein a staking hole into which the rivet terminal is inserted and a through hole into which a bolt is inserted. The secondary battery disclosed in Patent Document 1 is characterized in that the rivet terminal is connected and fastened to the terminal base by staking and the rivet terminal is also connected and fastened to the current collector joint by staking and welding.

PRIOR ART LITERATURE

Patent Document

Patent Document 1: JP-2004-14173-A

SUMMARY OF THE INVENTION

Problems to be Solved by the Invention

The secondary battery disclosed in Patent Document 1 encounters problems with complicated manufacturing process and great contact resistance. The first problem arises from the fact that it employs a member to electrically connect the bus bar to the generating element, which includes a terminal base, a rivet terminal, and a current collector. In addition, it needs connection of the rivet terminal to the terminal base and the current collector and also needs electrical connection between the terminal base and the current collector through the rivet terminal. The second problem arises from the fact that the secondary battery disclosed in Patent Document 1 has two connecting parts in the connecting passage between the terminal base and the current collector.

Means for Solving the Problem

According to the first embodiment of the present invention, the square secondary battery includes a generating element having an electrode; a battery can holding the generating element; a battery lid that seals an opening of the battery can; an external terminal arranged on the battery lid; and a current collector connecting the electrode of the generating element to the external terminal. The external terminal has a bus bar joint to which a bus bar is connected and a current collector joint to which the current collector is connected, the bus bar joint and the current collector joint being integrally juxtaposed on the battery lid. The current collector joint has a cylindrical insertion part to be inserted into a through hole in the battery lid and also has a sealing part arranged at an outer periphery of the insertion part, the sealing part pressing down a sealing member which seals a gap between the through hole and the insertion part. The cylindrical insertion part has in its inside a bottom which seals the through hole in the battery lid and has an end which is staked to the current collector.

According to the present invention, the square secondary battery is structured such that the bus bar joint connected to the bus bar and the current collector joint connected to the current collector are integrally arranged. This structure helps reduce contact resistance and saves battery assembling steps, thereby improving throughput yields.

BRIEF DESCRIPTION OF THE DRAWINGS

FIG. 4 is an exploded perspective view showing the lid assembly.

MODE FOR CARRYING OUT THE INVENTION

In what follows, the embodiment of the square secondary battery pertaining to the present invention will be described with reference to the accompanying drawings.

Figure 1:
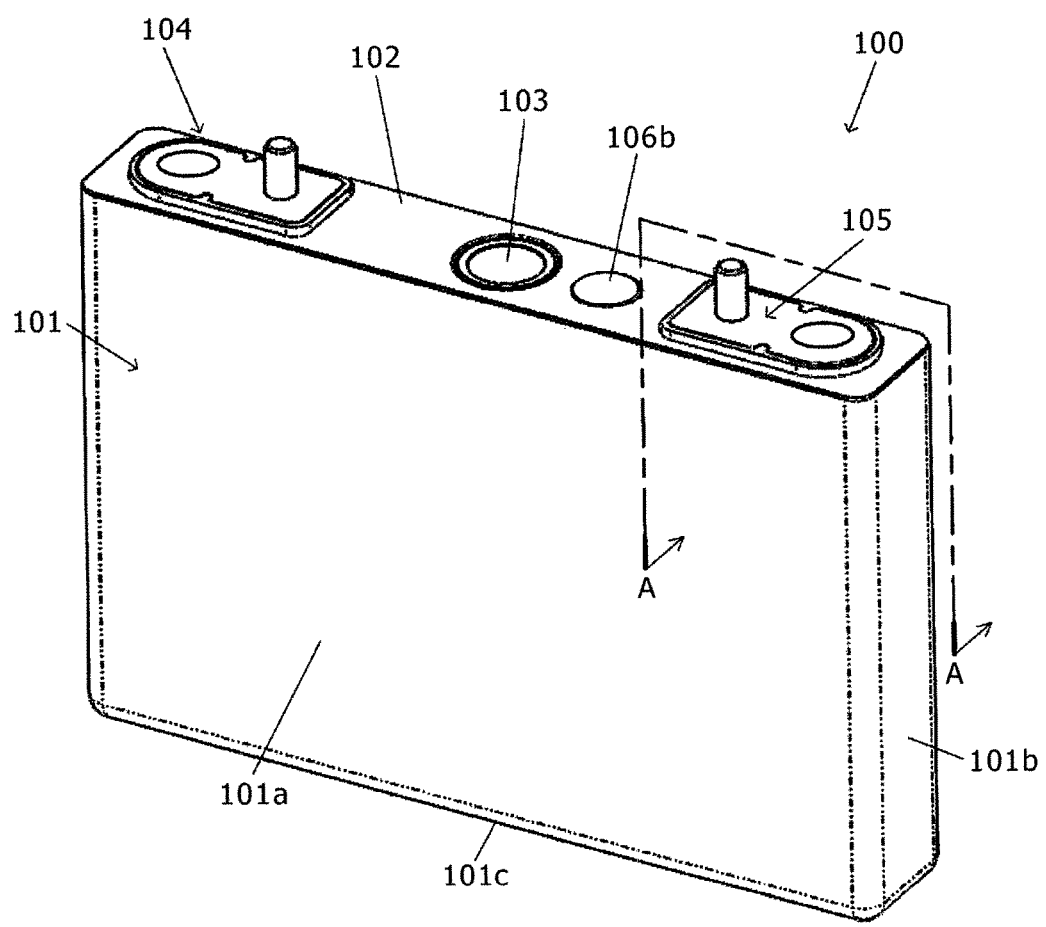
FIG. 1 is an external perspective view showing the square secondary battery pertaining to one embodiment of the present invention.
Figure 2:
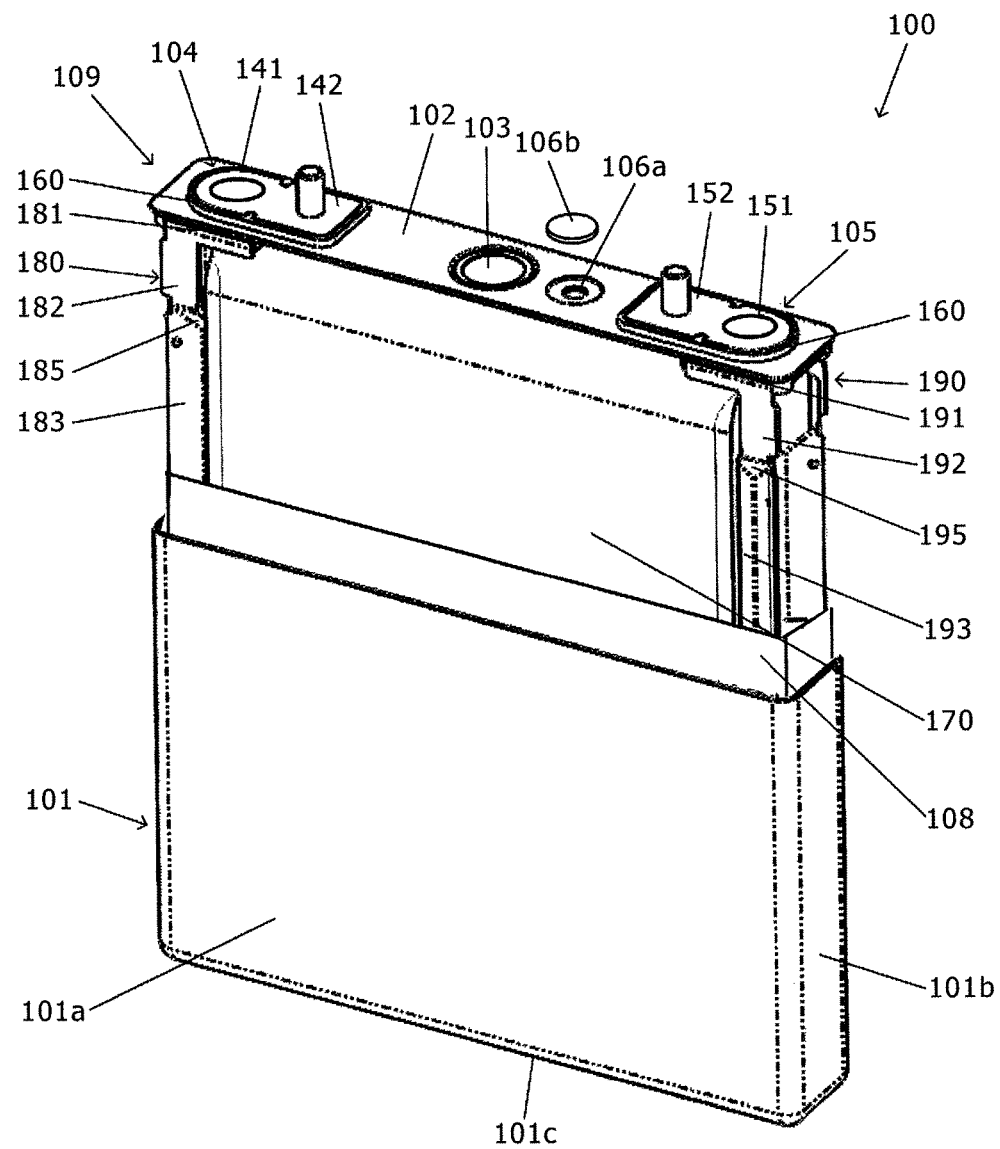
FIG. 2 is an exploded perspective view showing the structure of the square secondary battery pertaining to one embodiment of the present invention.

FIG. 1 is an external perspective view showing the square secondary battery 100, and FIG. 2 is an exploded perspective view showing the structure of the square secondary battery 100.

As shown in FIG. 1, the square secondary battery 100 has the battery container including a battery can 101 and a battery lid 102. The battery can 101 and the battery lid 102 are made of aluminum or aluminum alloy. The battery can 101 take on a shape of flat rectangular box with an open end, which is formed by deep drawing. Moreover, the battery can 101 have a bottom plate 101c, a pair of wide side plates 101a, and a pair of narrow side plates 101b, the plates 101a extending upward from the paired long sides of the bottom plate 101c, the plates 101b extending upward from the paired short sides of the bottom plate 101c.

As shown in FIG. 2, the battery can 101 hold therein wound electrodes 170 (shown in FIG. 3) supported by a lid assembly 107 (shown in FIG. 4). The wound electrodes 170 consist of a positive electrode 174 having a positive electrode current collector 180 attached thereto and a negative electrode 175 having a negative electrode current collector 190 attached thereto. They are covered with the insulating case 108 in the battery can 101. The insulating case 108 is made of an insulating resin such as polypropylene, and electrically insulates the battery can 101 from the wound electrodes 170.

As shown in FIGS. 1 and 2, the battery lid 102 takes on a rectangular flat shape and is laser-welded so as to close and seal the opening of the battery can 101. As shown in FIG. 1, the battery lid 102 has a positive electrode external terminal 104 and a negative electrode external terminal 105 arranged thereon, which are electrically connected respectively to the positive electrode 174 of the wound electrodes 170 and the negative electrode 175 of the wound electrodes 170 (both shown in FIG. 3).

The positive electrode external terminal 104 is electrically connected to the positive electrode 174 of the wound electrodes 170 via the positive electrode current collector 180, and the negative electrode external terminal 105 is electrically connected to the negative electrode 175 of the wound electrodes 170 via the negative electrode current collector 190. This structure enables the secondary battery to supply electric power to external equipment via the positive electrode external terminal 104 and the negative electrode external terminal 105 or to be charged with external electric power supplied to the wound electrodes 170 via the positive electrode external terminal 104 and the negative electrode external terminal 105.

As shown in FIG. 2, a liquid inlet 106a is drilled in the battery lid 102. Through the liquid inlet 106a the electrolyte is injected into the battery container. The liquid inlet 106a is sealed with an injection stopper 106b after injection of the electrolyte. The electrolyte may be a non-aqueous electrolyte such as the one based on a lithium salt (e.g., lithium hexafluorophosphate: $LiPF_6$) dissolved in an organic solvent of carbonate ester (e.g., ethylene carbonate).

The battery lid 102 is provided with a gas exhaust valve 103, which is formed by pressing to make the battery lid 102 partially thin. The gas exhaust valve 103 may also be formed by attaching a thin wall member to an opening in the battery lid 102 by means of laser welding or the like. The gas exhaust valve 103 breaks open when the square secondary battery 100 anomalously gets hot due to overcharging, thereby evolving gas to increase its internal pressure to a predetermined level. The gas exhaust valve 103 thus discharges gas from the battery container, thereby reducing the internal pressure of the battery container.

Figure 3:
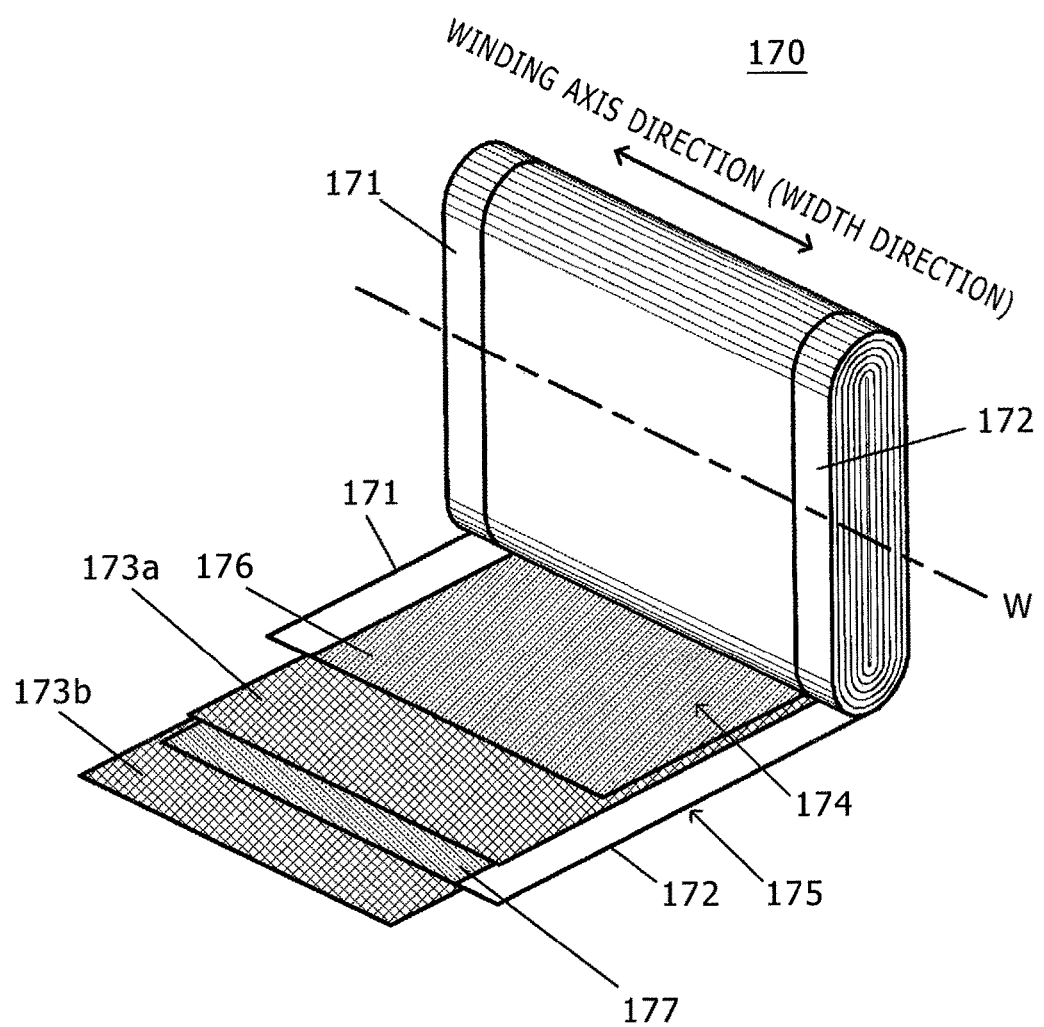
FIG. 3 is a perspective view showing the wound electrodes.

A description of the wound electrodes 170 is given below with reference to FIG. 3. FIG. 3 is a perspective view showing the wound electrodes 170, with the winding end thereof expanded. The wound electrodes 170, which serve as the generating element, make a laminated structure in the following manner. The positive electrode 174 and the negative electrode 175 in a form of continuous sheet are wound flat around a winding axis W with separators 173a and 173b intercalated.

The positive electrode 174 consists of a positive electrode foil 171 and a positive electrode active material mixture layer 176 applied to both sides of the positive electrode foil 171. The positive electrode active material mixture is a mixture of a positive electrode active material and a binder. The negative electrode 175 consists of a negative electrode foil 172 and a negative electrode active material mixture layer 177 applied to both sides of the foil 172. The negative electrode active material mixture is a mixture of a negative electrode active material and a binder.

The positive electrode foil 171 is an aluminum foil having approximately 20 to 30 μm in thickness, and the negative electrode foil 172 is a copper foil having approximately 15 to 20 μm in thickness. The separators 173a and 173b are made of fine porous polyethylene resin through which lithium ions are able to pass. The positive electrode active material is a composite oxide of lithium-containing transition metal, such as lithium manganate, and the negative electrode active material is a carbonaceous material, such as graphite, capable of reversibly occluding and releasing lithium ions.

The wound electrodes 170 are defined by two ends facing each other which are perpendicular to the winding axis W in a width direction or the winding direction. One of the ends forms the laminate of the positive electrodes 174, and the other forms the laminate of the negative electrode 175. The laminate of the positive electrode 174, disposed on one of the ends, is formed from a laminated uncoated part of the positive electrode which is not coated with the positive electrode active material mixture layer 176, the uncoated part corresponding to an exposed part of the positive electrode foil 171. And the laminate of the negative electrode 175, disposed on the other of the ends, is formed from a laminated uncoated part of the negative electrode which is not coated with the negative electrode active material mixture layer 177, the uncoated part corresponding to an exposed part of the negative electrode foil 172. The laminate of the uncoated part of the positive electrode and that of the negative electrode are compressed and flattened in advance. They are further connected respectively to the positive electrode current collector 180 and the negative electrode current collector 190 of the below-mentioned lid assembly 107 (shown in FIG. 4) by means of ultrasonic bonding. In this way there is formed the electrode assembly 109 (shown in FIG. 2).

Figure 5:
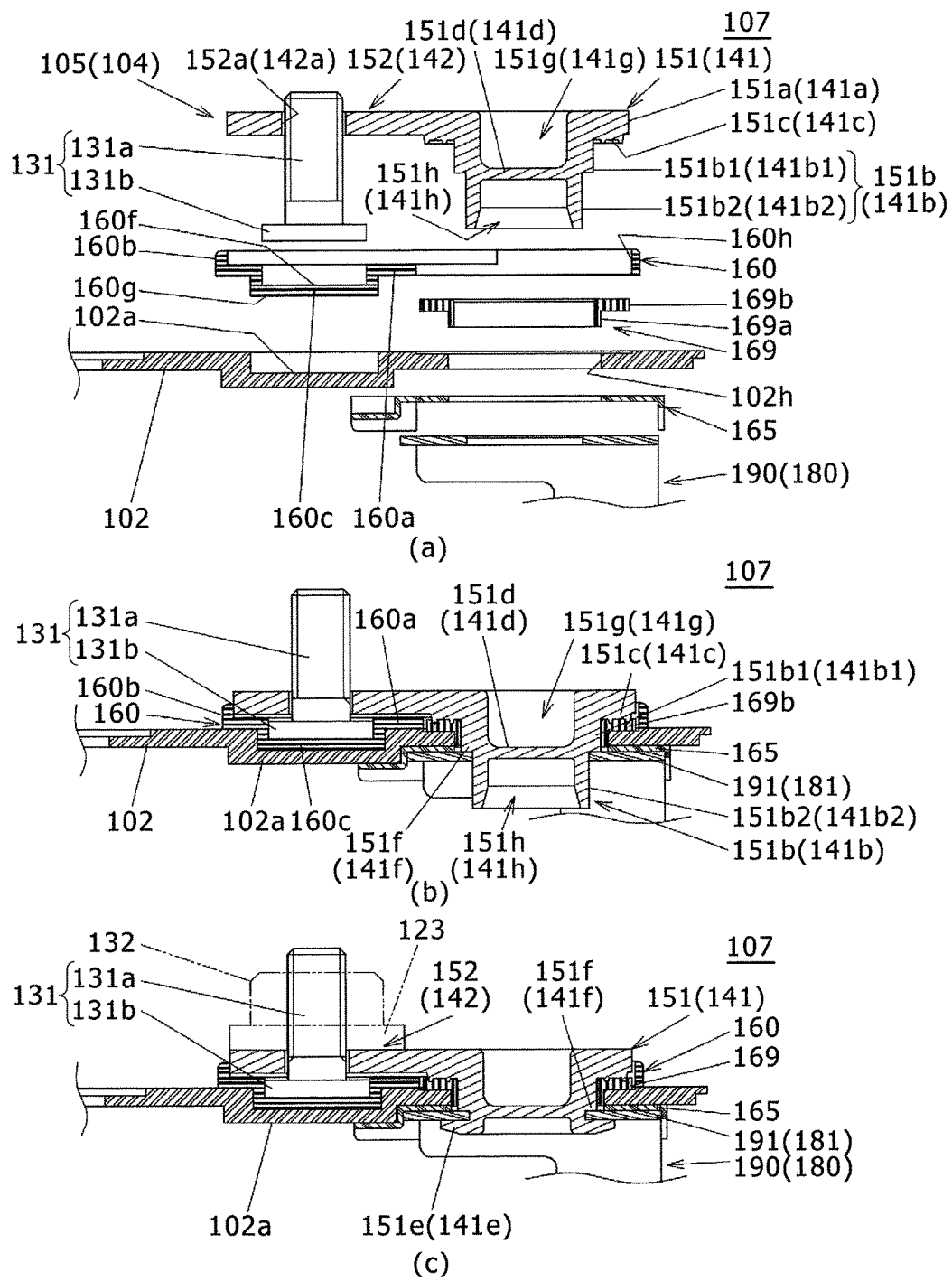
FIG. 5(a)-5(c) are sectional views showing the structure of the lid assembly.

In what follows, the structure of the lid assembly 107 will be described in more detail with reference to FIGS. 4 to 6. FIG. 4 is an exploded perspective view showing the lid assembly 107. FIG. 5 is a sectional view showing the structure of the lid assembly 107. FIG. 5(a) is a sectional view taken along the line B-B in FIG. 4. FIG. 5(b) is a sectional view of the lid assembly 107 in its assembled state, with the end of the positive electrode insertion part 141b and the end of the negative electrode insertion part 151b being not yet staked. FIG. 5(c) is a sectional view taken along the line A-A in FIG. 1, with the end of the positive electrode insertion part 141b and the end of the negative electrode insertion part 151b having been staked. FIG. 5 only shows the structure at the negative electrode, but that at the positive electrode is similar to that of the negative electrode. Therefore, for the sake of convenience, the elements of the structure of the positive electrode are referenced by parenthesized numbers.

As shown in FIGS. 4 and 5(a), the lid assembly 107 includes the battery lid 102, the positive electrode external terminal 104 arranged at one end of the battery lid 102, the negative electrode external terminal 105 arranged at the other end of the battery lid 102, a pair of external insulators 160, a pair of internal insulators 165, a pair of gaskets 169, the positive electrode current collector 180, and the negative electrode current collector 190.

The positive electrode external terminal 104 and the positive electrode current collector 180 are made of aluminum. The positive electrode external terminal 104 is electrically connected to the positive electrode current collection 180 as the positive electrode insertion part 141b is staked to a bearing surface 181 of the positive electrode current collector 180, as described later, (see FIG. 7). The negative electrode external terminal 105 and the negative electrode current collector 190 are made of copper alloy. The negative electrode external terminal 105 is electrically connected to the negative electrode current collector 190 as the negative electrode insertion part 151b is staked to a bearing surface 191 of the negative electrode current collector 190, as described later (See FIG. 7).

The positive electrode external terminal 104, the negative electrode external terminal 105, the positive electrode current collector 180, and the negative electrode current collector 190 are attached to the battery lid 102, with the external insulator 160, the internal insulator 165, and the gasket 169 interposed between them. The external insulator 160 and the internal insulator 165 are made of insulating resin such as polypropylene (PP). The gasket 169 is made of insulating resin such as tetraethylene-perfluoroalkyl vinyl ether copolymer (PFA).

The square secondary battery 100 may be combined with another square secondary battery (not shown) by connection through bus bars to constitute a battery pack. According to the present embodiment, a bus bar 123 (indicated by a two-dot chain line) is connected to the external terminals 104 and 105 of the square secondary battery 100 by means of a bolt 131 and a nut 132, as shown in FIG. 5(c). The square secondary battery 100 has a pair of bolts 131 to which the bus bar 123 is screwed. As shown in FIG. 5(a), the bolt 131 includes a rectangular flat head 131b and a shank 131a extending therefrom. The shank 131a has a male screw threaded thereon. The bolt 131 is made of alloy steel such as stainless steel and chromium molybdenum steel.

Figure 6:
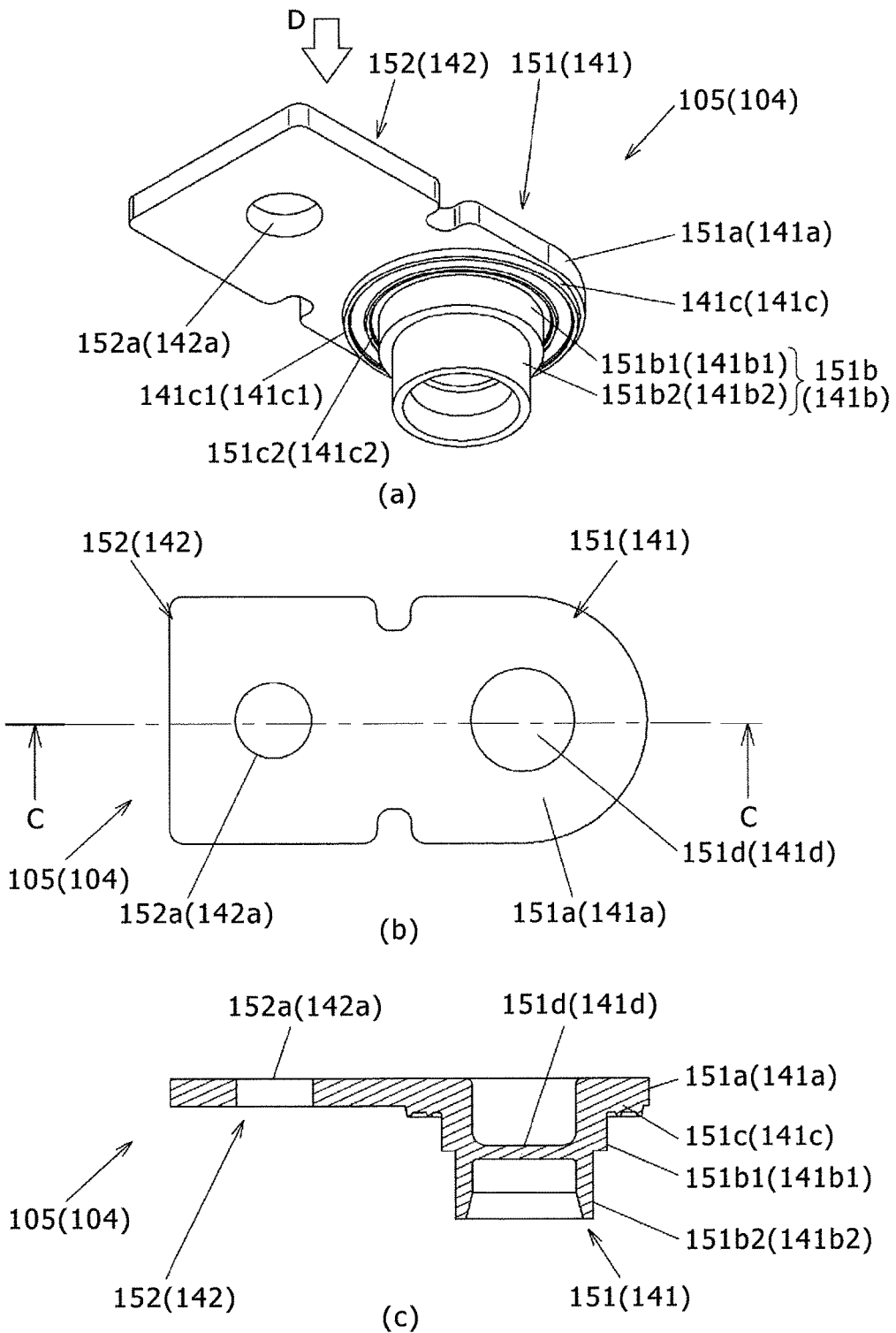
FIG. 6(a) is an external perspective view of the external terminal.
FIG. 6(b) is a plan view of the external terminal, as viewed in the direction D in FIG. 6(a).
FIG. 6(c) is a sectional view of the external terminal taken along the line C-C in FIG. 6(b).

FIG. 6 is a diagram showing parts constituting the external terminal. FIG. 6(a) is an external perspective view of the external terminal. FIG. 6(b) is a plan view of the external terminal, as viewed in the direction D in FIG. 6(a). FIG. 6(c) is a sectional view of the external terminal taken along the line C-C in FIG. 6(b).

As shown in FIGS. 4, 5(a), and 6, the positive electrode external terminal 104 has a bus bar connector 142, to which the bus bar 123 is electrically connected, and a current collector connector 141, to which the positive electrode current collector 180 is electrically connected. The bus bar connector 142 and the current collector connector 141 are integrally juxtaposed on the battery lid 102.

By the same token, the negative electrode external terminal 105 has a bus bar connector 152, to which the bus bar 123 is electrically connected, and a current collector connector 151, to which the negative current collector 190 is electrically connected. The bus bar connector 152 and the current collector connector 151 are integrally juxtaposed on the battery lid 102.

The positive electrode external terminal 104 and the negative electrode external terminal 105 are formed from a plate-like member by pressing or forging. There will be given later a detailed description of the method of forming the positive electrode external terminal 104 and the negative electrode external terminal 105.

The bus bar connector 142 of the positive electrode external terminal 104, which is of a rectangular flat plate, has a through hole 142a into which the shank 131a of the bolt 131 is inserted. The bus bar connector 142 is arranged on the outside of the battery container. The bus bar connector 142 has a flat surface with which the bus bar 123 comes into contact. The bus bar 123 becomes fixed in contact with the contact surface when the bus bar 123 is screwed with the use of the bolt 131 and the nut 132 [See FIG. 5(c)].

By the same token, the bus bar connector 152 of the negative electrode external terminal 105, which is of a rectangular flat plate, has a through hole 152a into which the shank 131a of the bolt 131 is inserted. The bus bar connector 152 is arranged on the outside of the battery container. The bus bar connector 152 has a flat surface with which the bus bar 123 comes into contact. The bus bar 123 becomes fixed in contact with the contact surface when the bus bar 123 it is screwed with the use of the bolt 131 and the nut 132. [See FIG. 5(c)]

As shown in FIGS. 5(a) and 6, the current collector connector 141 of the positive electrode external terminal 104 has a base section 141a, a positive electrode insertion part 141b, and a sealing part 141c. The base section 141a extends along the battery lid 102 from the bus bar connector 142. The positive electrode insertion part 141b projects toward the inside of the battery container from the base section 141a. The sealing part 141c is arranged on the outer periphery of the positive electrode insertion part 141b. There exists a constricted part between the bus bar connector 142 and the base section 141a. The bus bar connector 142 and the current collector connector 141 are joined together via the constricted part.

By the same token, the current collector connector 151 of the negative electrode external terminal 105 has a base section 151a, a negative electrode insertion part 151b, and a sealing part 151c. The base section 151a extends along the battery lid 102 from the bus bar connector 152. The negative electrode insertion part 151b projects toward the inside of the battery container from the base section 151a. The sealing part 151c is arranged on the outer periphery of the negative electrode insertion part 151b. There exists a constricted part between the bus bar connector 152 and the base section 151b. The bus bar connector 152 and the current collector connector 151 are joined together via the constricted part.

The positive electrode insertion part 141b is formed in such a way that it projects toward the inside of the battery container from the base section 141a and also penetrates a through hole 102h of the battery lid 102. The positive electrode insertion part 141b has a base side insertion part 141b1, which projects toward the inside of the battery container from the base section 141a, and an end side insertion part 141b2, which projects toward the inside of the battery container from the base side insertion part 141b1. The end side insertion part 141b2 is smaller in outside diameter than the base side insertion part 141b1. The end side insertion part 141b2 is such a part as is staked to the bearing surface 181 of the positive electrode current collector 180, as described later (See FIG. 7).

By the same token, the negative electrode insertion part 151b is formed in such a way that it projects toward the inside of the battery container from the base section 151a and also penetrates the through hole 102h of the battery lid 102. The negative electrode insertion part 151b has a base side insertion part 151b1, which projects toward the inside of the battery container from the base section 151a, and an end side insertion part 151b2, which projects toward the inside of the battery container from the base side insertion part 151b1. The end side insertion part 151b2 is smaller in outside diameter than the base side insertion part 151b1. The end side insertion part 151b2 is such a part as is staked to the bearing surface 191 of the negative electrode current collector 190, as described later (See FIG. 7).

As shown in FIG. 5(a), the positive electrode insertion part 141b is formed in a cylindrical shape, and has a bottom part 141d between the base-side insertion part 141b1 and the end-side insertion part 141b2, the part 141b1 being at the inside of the positive insertion part 141b. Therefore, the through hole 102h of the battery lid 102 is sealed by the bottom part 141d. In other words, as shown in FIG. 5(b), the positive electrode insertion part 141b has on its outside a cylindrical recess 141g, which is concave toward the inside of the battery container, and also has on its inside a cylindrical recess 141h, which is concave toward the outside of the battery container. The cylindrical recesses 141g and 141h have the bottom part 141d in common, and also have their respective central axes that coincide.

By the same token, as shown in FIG. 5(a), the negative electrode insertion part 151b is formed in a cylindrical shape, and has a bottom part 151d between the base-side insertion part 151b1 and the end-side insertion part 151b2, the part 151b1 being at the inside of the negative insertion part 151b. Therefore, the through hole 102h of the battery lid 102 is sealed by the bottom part 151d. In other words, as shown in FIG. 5(b), the negative electrode insertion part 151b has on its outside a cylindrical recess 151g, which is concave toward the inside of the battery container, and also has on its inside a cylindrical recess 151h, which is concave toward the outside of the battery container. The cylindrical recesses 151g and 151h have the bottom part 151d in common, and also have their respective central axes that coincide.

As shown in FIGS. 5(a) and 6, the sealing part 141c of the positive electrode external terminal 104 projects, from the base part 141a toward the inside of the battery container, at an outer periphery of the base-side insertion part 141b1. The sealing part 141c has a circular end surface which presses down a flange 169b of the gasket 169 to be described later. On this circular end surface the first circular projection 141c1 and the second circular projection 141c2 are provided.

By the same token, as shown in FIGS. 5(a) and 6, the sealing part 151c of the negative electrode external terminal 105 projects, from the base part 151a toward the inside of the battery container, at the outer periphery of the base-side insertion part 151b1. The sealing part 151c has a circular end surface which presses down the flange 169b of the gasket 169 to be described later. On this circular end surface a first projection 151c1 and a second projection 151c2 both having a circular shape are provided.

As shown in FIGS. 4 and 5(a), the battery lid 102 has a pair of fitting recesses 102a and a pair of the through holes 102h. The fitting recesses 102a are formed to be concave toward the inside of the battery container. The through holes 102h allow the base-side insertion part 141b1 of the positive electrode insertion part 141b and the base-side insertion part 151b1 of the negative electrode insertion part 151b to penetrate. A fitting recess 102a is a part into which the head 131b of the bolt 131 fits with the external insulator 160 interposed. The fitting recess 102a is formed in a rectangular shape when seen in plan view while conforming to the shape of the head 131b of the bolt 131.

In what follows, the external insulator 160 will be explained with reference to FIGS. 4 and 5. Since the external insulator 160 for the positive electrode and the external insulator 160 for the negative electrode are identical in shape, the latter will be described as a representative. The external insulator 160 has a terminal insulating part 160a, a covering wall 160b, a bolt insulating part 160c, and the through hole 160h into which the gasket 169 is inserted.

The terminal insulating part 160a is interposed between the bus bar connecting part 152 of the negative electrode external terminal 105 and the battery lid 102, so that it insulates the negative electrode external terminal 105 from the battery lid 102. The covering wall 160b, constituting the outer edge of the external insulator 160, covers the bus bar connecting part 152 and the side of the base part 151a, the bus bar connecting part 152 being a part of the negative electrode external terminal 105 and exposing itself to the outside of the battery container.

The bolt insulating part 160c has a concave surface 160f and a convex surface 160g. The concave surface 160f is recessed from the terminal insulating part 160a toward the battery lid 102. The convex surface 160g projects from the terminal insulating part 160a toward the battery lid 102 such that it fits the concave surface 160f. The concave surface 160f is formed in conformity with the external shape of the head 131b of the bolt 131. And the convex surface 160g is formed in conformity with a fitting concave part 102a of the battery lid 102.

The fitting concave part 102a of the battery lid 102 is a part into which the head 131b of the bolt 131 is fitted with the bolt insulating part 160c interposed. In other words, the bolt insulating part 160c exists between the fitting concave part 102a of the battery lid 102 and the head 131b of the bolt 131 so that it insulates the bolt 131 from the battery lid 102. Incidentally, the foregoing is applicable to the structure of the positive electrode side; that is, the external insulating part 160 capable of insulation is interposed between the battery lid 102 and the positive electrode external terminal 104 so that insulation is ensured between the positive electrode external terminal 104 and the battery lid 102.

The gasket 169 will be described below with reference to FIG. 5. Since the gaskets 169 at the positive electrode and the negative electrode are identical in shape, the following description covers only the gasket 169 at the negative electrode. The gasket 169 has a cylindrical part 169a and a flange 169b attached to one end of the cylindrical part 169a. The gasket 169 is fitted on the base end side insertion part 151b1 of the negative electrode insertion part 151b.

The cylindrical part 169a of the gasket 169 is interposed between the through hole 102h of the battery lid 102 and the base end side insertion part 151b1 of the negative electrode insertion part 151b. A flange 169b of the gasket 169 is interposed between the external surface of the battery lid 102 and the circular end surface of the sealing part 151c while being pressed toward the sealing part 151c and compressed in a predetermined amount. This structure forms sealing between the base end side insertion part 151b1 of the negative electrode insertion part 151b and the through hole 102h of the battery lid 102. Since the gasket 169 is capable of insulation as mentioned above, the negative electrode external terminal 105 is insulated from the battery lid 102. The positive electrode side is also provided with the gasket 169 capable of insulation in the same way as above so as to ensure sealing between the base end side insertion part 141b1 of the positive electrode external terminal 104 and the through hole 102h of the battery lid 102.

As shown in FIG. 6(a), the flange 169b of the gasket 169 is compressed along its entire periphery by the first projections 141c1 and 151c1 and the second projections 141c2 and 151c2 having circular shapes. This structure maintains contact, along the entire periphery, between the flange 169b of the gasket 169 and all of the first projections 141c1 and 151c1 and the second projections 141c2 and 151c2, even though there is unbalanced compression. Thus the battery container keeps airtightness and its stability.

The following is a description of the positive electrode current collector 180 and the negative electrode current collector 190 with reference to FIG. 4. The positive electrode current collector 180 electrically connects the positive electrode external terminal 104 to the positive electrode 174 of the wound electrodes 170. The negative electrode current collector 190 electrically connects the negative electrode external terminal 105 to the negative electrode 175 of the wound electrodes 170.

As shown in FIG. 4, the positive electrode current collector 180 has a bearing surface 181 parallel to the inner surface of the battery lid 102, a pair of flat plates 182, and the connecting flat part 183. The flat plates 182 bend at an angle of approximately 90 degrees from the side of the bearing surface 181 and extend toward the bottom plate 101c of the battery can 101 along the wide side plate 101a of the battery can 101. The connecting flat part 183 is connected by the inclined part 185 provided at the respective lower ends of the paired flat plates 182. The bearing surface 181 has a through hole into which the end side insertion part 141b2 of the positive electrode insertion part 141b is inserted.

By the same token, the negative electrode current collector 190 has the bearing surface 191 parallel to the inner surface of the battery lid 102, the a pair of flat plates 192, and the connecting flat part 193. The flat plates 192 bend at an angle of approximately 90 degrees from the side of the bearing surface 191 and extend toward the bottom plate 101c of the battery can 101 along the wide side plate 101a of the battery can 101. The connecting flat part 193 is connected by a inclined part 195 provided at the respective lower ends of the paired flat plates 192. The bearing surface 191 has a through hole into which the end side insertion part 151b2 of the positive electrode insertion part 151b is inserted.

The internal insulator 165, which is of a rectangular flat form, is arranged between the bearing surface 181 of the positive electrode current collector 180 and the battery lid 102 and also between the bearing surface 181 of the negative electrode current collector 190 and the battery lid 102. Thus, insulation is made by the internal insulator 165 between the positive electrode current collector 180 and the battery lid 102 and between the negative electrode current collector 190 and the battery lid 102. The internal insulator 165 at the positive electrode and the internal insulator 165 at the negative electrode are identical in shape. The internal insulator 165 at the positive electrode has a through hole into which the base end side insertion part 141b1 of the positive electrode insertion part 141b is inserted. The internal insulator 165 at the negative electrode further has a through hole into which the base end side insertion part 151b1 of the negative electrode insertion part 151b is inserted.

As shown in FIG. 5(b), the positive electrode insertion part 141b is inserted into the through hole 102h of the battery lid 102 and the through hole of the internal insulator 165, with the gasket 169 attached to the base end side insertion part 141b. The end side insertion part 141b2 of the positive electrode insertion part 141b is inserted into the through hole formed in the bearing surface 181 of the positive electrode current collector 180. As depicted, the step part 141f formed between the base end side insertion part 141b1 and the end side insertion part 141b2 comes into contact with the bearing surface 181. The fore-end of the end side insertion part 141b2 is staked to the bearing surface 181, with the flange 169b of the gasket 169 being held between the sealing part 141c and the external surface of the battery lid 102. As a result, there is formed a positive electrode's staked part 141e, as shown in FIG. 5(c).

Consequently, the bearing surface 181 is held between the positive electrode's staked part 141e and the base end side insertion part 141b1. Moreover, an electrical connection is established between the positive electrode current connector 180 and the positive electrode external terminal 104. Incidentally, the positive electrode's staked part 141e and the bearing surface 181 of the positive electrode current collector 180 may be joined together by laser spot welding after the staking.

By the same token, as shown in FIG. 5(b), the negative electrode insertion part 151b is inserted into the through hole 102h of the battery lid 102 and the through hole of the internal insulator 165, with the gasket 169 attached to the base end side insertion part 151b. The end side insertion part 151b2 of the negative electrode insertion part 151b is inserted into the through hole formed in the bearing surface 191 of the negative electrode current collector 190. As depicted, a step part 151f formed between the base end side insertion part 151b1 and the end side insertion part 151b2 comes into contact with the bearing surface 191. The fore-end of the end side insertion part 151b2 is staked to the bearing surface 191, with the flange 169b of the gasket 169 being held between the sealing part 151c and the external surface of the battery lid 102. As a result, there is formed a negative electrode staked part 151e, as shown in FIG. 5(c).

Consequently, the bearing surface 191 is held between the negative electrode staked part 151e and the base end side insertion part 151b1. Moreover, an electrical connection is established between the negative electrode current connector 190 and the negative electrode external terminal 105. Incidentally, the negative electrode staked part 151e and the bearing surface 191 of the positive electrode current collector 190 may be joined together by laser spot welding after the staking.

Figure 7:
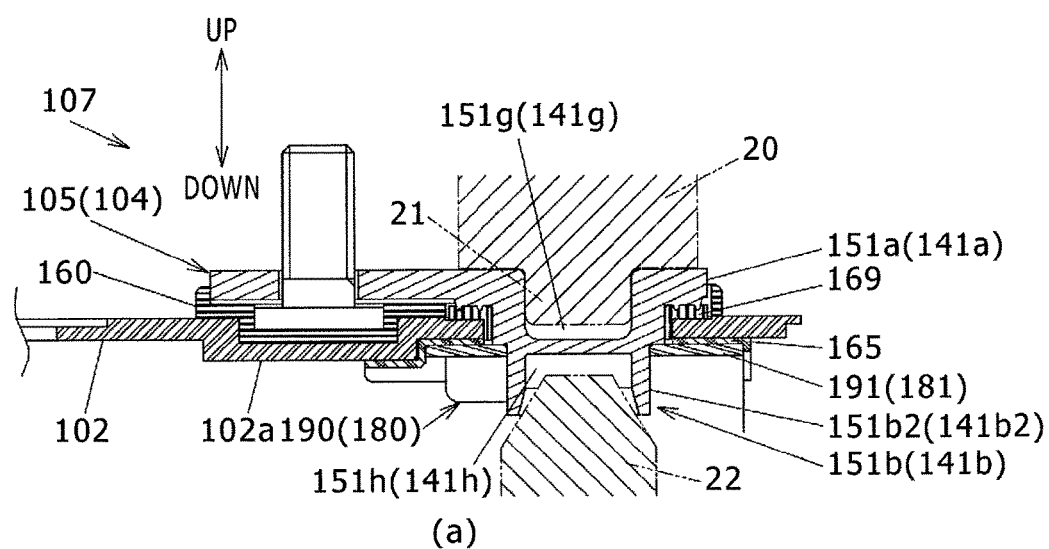
FIGS. 7(a) and 7(b) are diagrams showing the process of staking to fix the end of the current collector joint of the external terminal.
Figure 7:
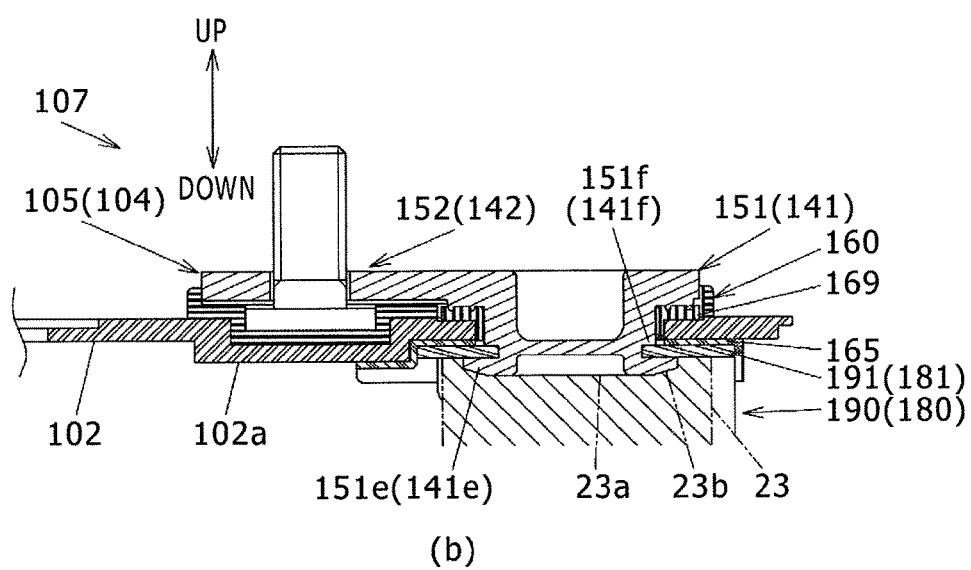
Figure 8:
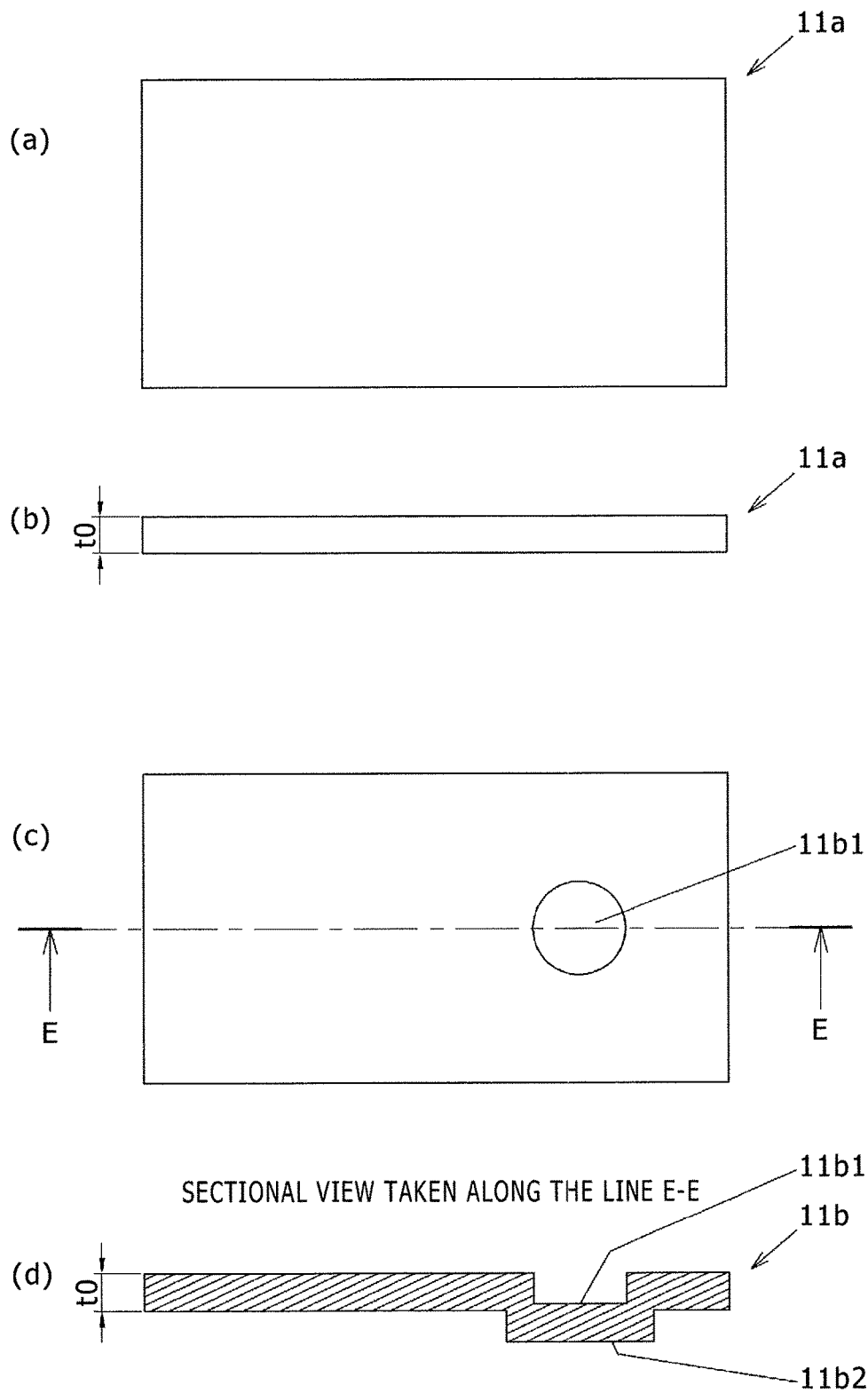
FIG. 8(a) is a plan view of a material.
FIG. 8(b) is a side view of the material.
FIG. 8(c) is a plan view of the material after the first pressing step.
FIG. 8(d) is a side sectional view of the material after the first pressing step.
Figure 9:
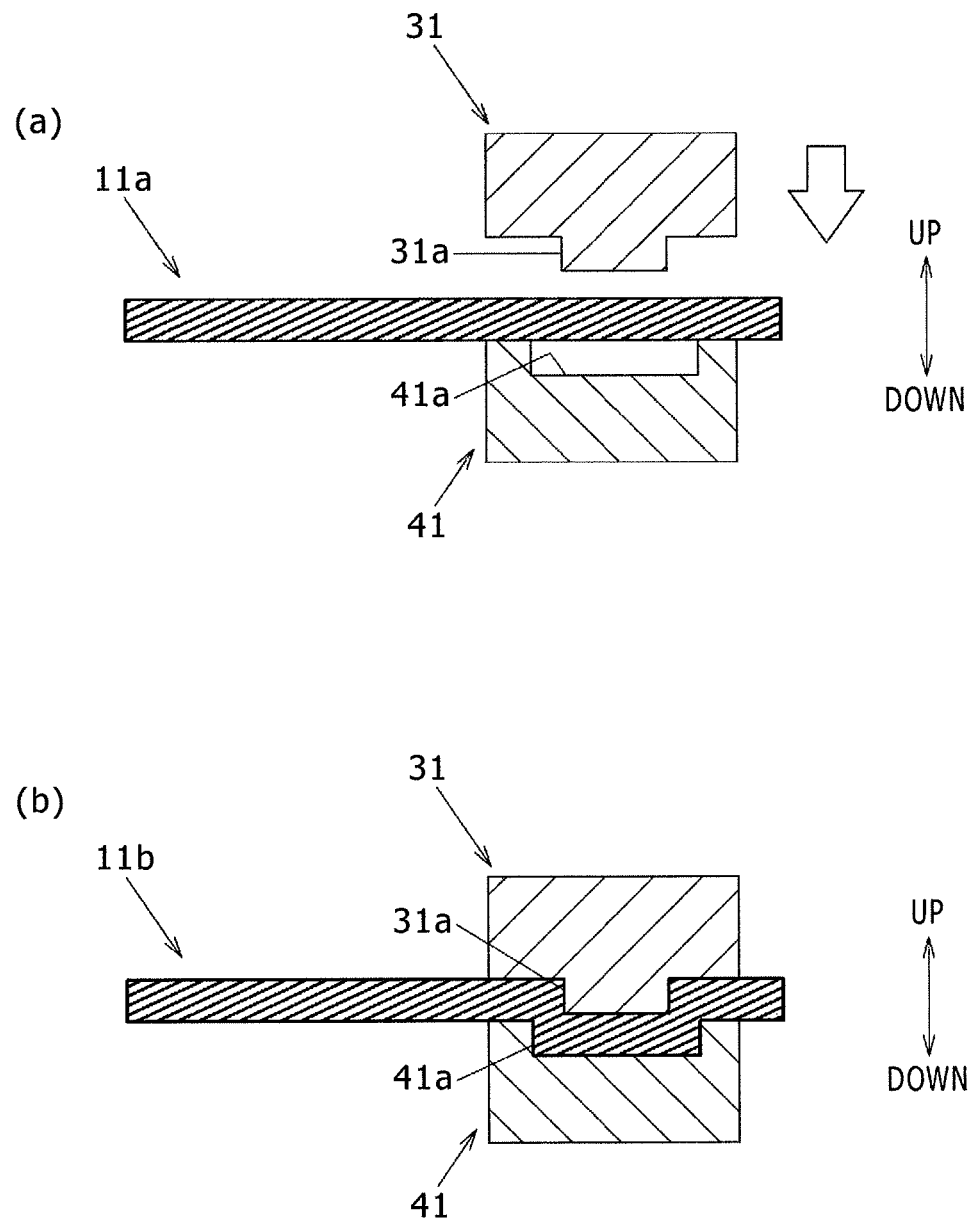
FIGS. 9(a) and 9(b) are diagrams showing the first pressing step.
Figure 10:
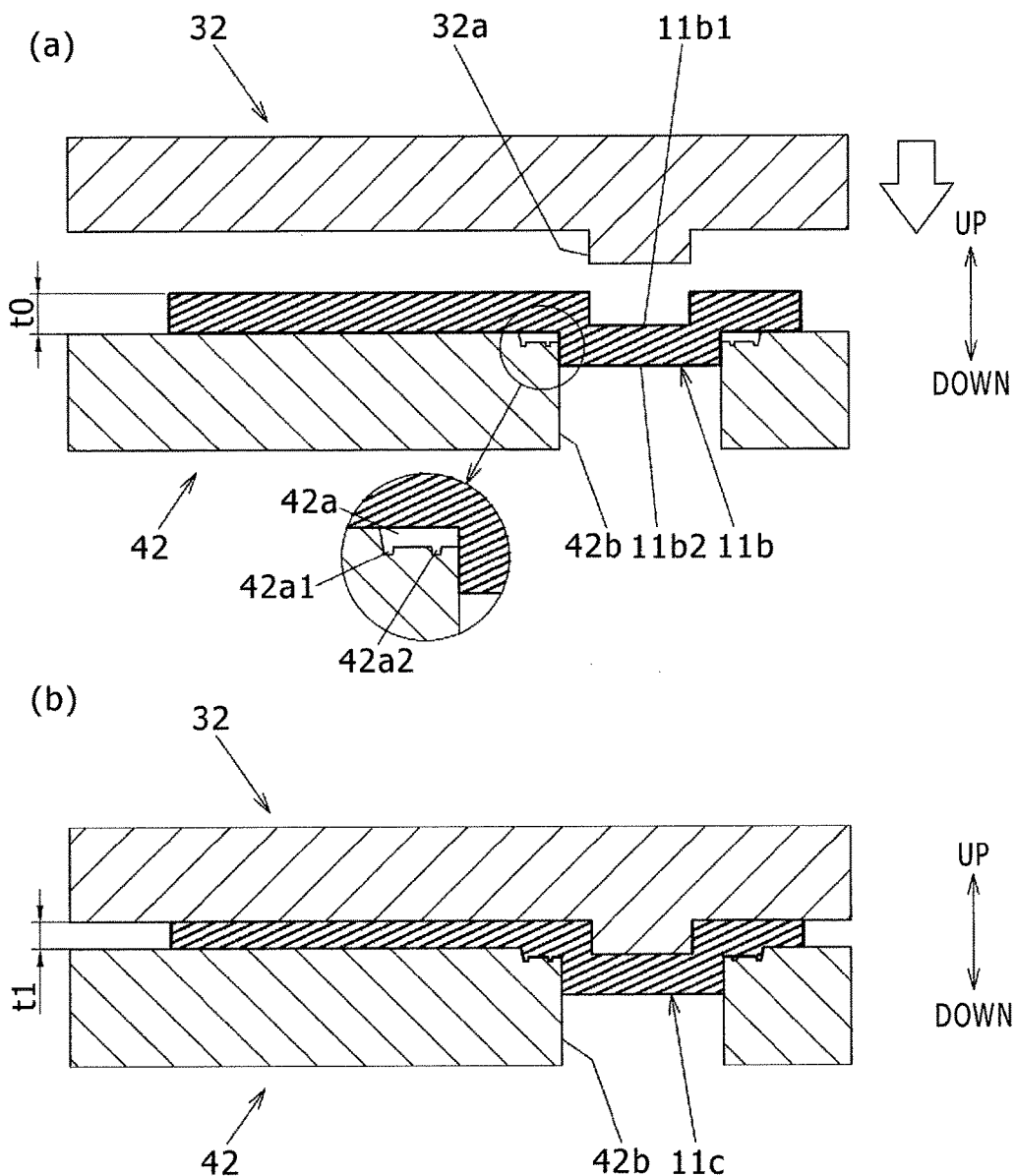
FIGS. 10(a) and 10(b) are diagrams showing the second pressing step.
Figure 11:
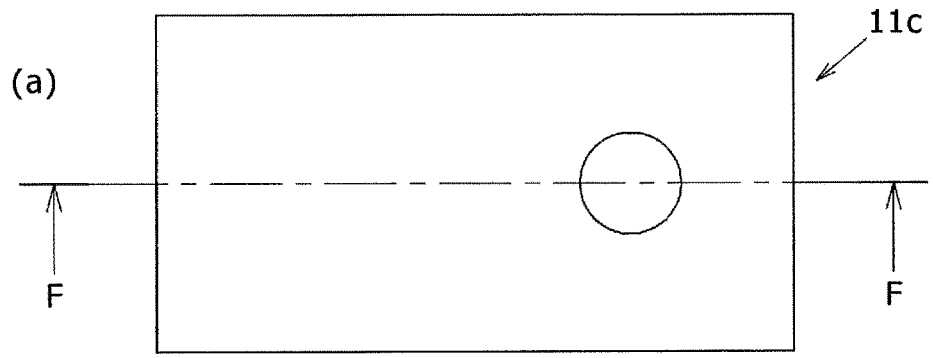
FIGS. 11(a) and 11(b) respectively show a plan view and a side sectional view of the material which has gone through the second pressing step.
FIGS. 11(c) and 11(d) respectively show a plan view and a side sectional view of the material after the forging step.
Figure 11:
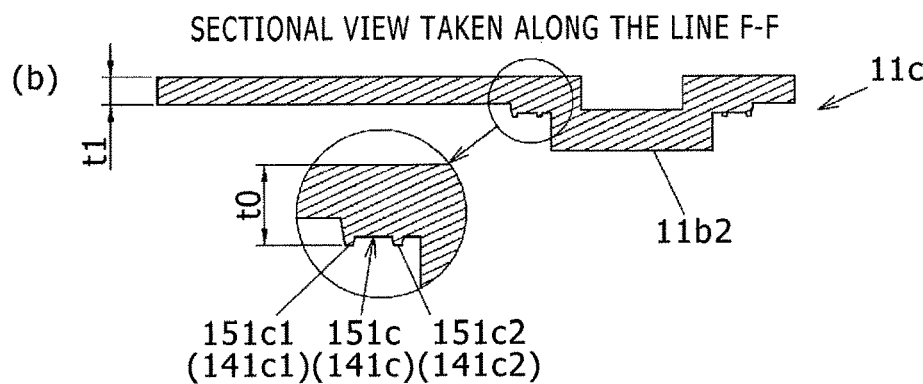
Figure 11:
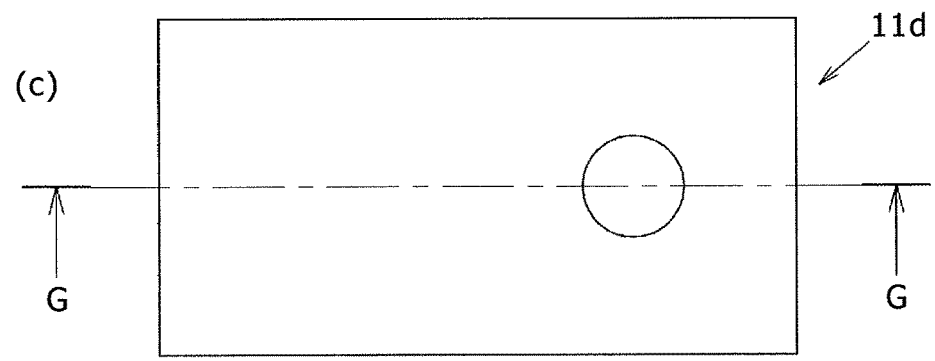
Figure 11:
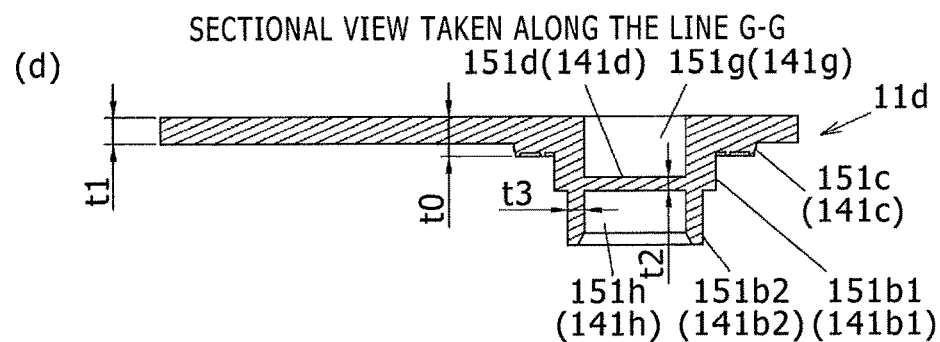

The staking process will be described below with reference to FIG. 7. An identical process is employed for staking the positive electrode insertion part 141b to the bearing surface 181 of the positive electrode current collection 180 and for staking the negative electrode insertion part 151b to the bearing surface 191 of the negative electrode current collector 190. Therefore, only the latter staking process for the negative electrode will be described as a representative. Incidentally, the vertical direction is defined as shown for the sake of convenience of description.

As shown in FIG. 7(a), an upper die 20 of the staking machine is placed over the lid assembly 107, and an lower die 22 of the staking machine is placed under the lid assembly 107. The upper die 20 of the staking machine has a surface that comes into contact with the base part 151a of the current connector joint 151 and also has a cylindrical projection 21 which extends downward from the contact surface. The lower die 22 of the staking machine is of a shape of conical trapezoid, with its top being a circular flat in the plan view.

The contact surface of the upper die 20 is brought into contact with the outer surface of the base part 151a. The upper die 20 of the staking machine has its projection 21 fitted into the outer recess 151g, so that the negative electrode external terminal 105 is positioned easily and accurately with relation to the staking machine.

The lower die 22 is forced into the inner recess 151h of the negative electrode insertion part 151b, with a upper die 21 kept in contact with the base part 151a. This step expands outward the fore-end of the cylindrical end side insertion part 151b2. The step of expanding the fore-end of the end side insertion part 151b2 causes the negative electrode current collector 190, the negative electrode external terminal 105, the gasket 169, the external insulator 160, and the internal insulator 165 to be temporarily fastened to the battery lid 102.

The lower die 22 of conical trapezoid shape is forced into the internal recess 151h of the negative electrode insertion part 151b by sequentially replacing it by those which gradually increase in the end angle, so that the end of the negative electrode insertion part 151b is gradually expanded outward and increased in diameter. Incidentally, each of the foregoing steps enables the lower die 22 of conical trapezoid shape to be accurately forced into the inner recess 151h of the negative electrode insertion part 151b because the projection 21 of the upper die 20 remains fitted into the outer recess 151g.

As shown in FIG. 7(b), the next step is to prepare a lower die 23 that has a flat part 23a, which is parallel to the battery lid 102 and circular in the plan view, and an inclined part 23b, which inclines to the battery lid 102 from the flat part 23a and is circular in the plan view. Pressing the lower die 23 toward the fore-end of the negative electrode insertion part 151b forms the negative electrode staked part 151e having a circular shape in the plan view. In this way, the negative electrode current collector 190, the negative electrode external terminal 105, the gasket 169, the external insulator 160, and the internal insulator 165 are tightly fastened to and integrated with the battery lid 102. Incidentally, the positive electrode insertion part 141b is also staked to the bearing surface 181 of the positive electrode current collector 180 in the same way as above. As a result, the positive electrode current collector 180, the positive electrode external terminal 104, the gasket 169, the external insulator 160, and the internal insulator 165 are tightly fastened to and integrated with the battery lid 102.

As the positive electrode external terminal 104 is incorporated into the battery lid 102, the positive electrode side space, which is of rectangular parallelepiped, is demarcated by a bus bar connecting part 142 and the fitting recess 102a of the battery lid 102. As shown in FIG. 5(c), the positive electrode side space is a space for storing the head 131b of the bolt 131 between the battery lid 102 and the bus bar connecting part 142.

The positive electrode side space is a space used to fasten, by screwing, the bus bar 123 to the bus bar connecting part 142 with the use of the bolt 131 and the nut 132. The side face of the fitting recess 102a of the battery lid 102 which constitutes the positive electrode side space engages with the side face of the head 131b of the bolt 131, with the external insulator 160 interposed, when the nut 132 is tightened to the shank 131a of the bolt 131, so that the bolt 131 is restrained from rotating. That face of the bus bar connecting part 142 which constitutes the positive electrode side space and which is near the battery lid 102 engages with the head 131b of the bolt 131, thereby preventing the bolt 131 from slipping off. Storing the bolt head 131b of the bolt 131 in the positive electrode side space enables the bus bar 123 to be easily connected to the positive electrode external terminal 104 by use of the bolt 131 and the nut 132.

By the same token, when the negative electrode external terminal 105 is incorporated into the battery lid 102, the negative electrode side space, which is of rectangular parallelepiped, is demarcated by the bus bar connecting part 152 and the fitting recess 102a of the battery lid 102. As shown in FIG. 5(c), the negative electrode side space is a space for storing the head 131b of the bolt 131 between the battery lid 102 and the bus bar connecting part 152.

The negative electrode side space is a space used to fasten, by screwing, the bus bar 123 to the bus bar connecting part 152 with the use of the bolt 131 and the nut 132. That side face of the fitting recess 102a of the battery lid 102 which constitutes the negative electrode side space engages with the side face of the head 131b of the bolt 131, with the external insulator 160 interposed between them, when the nut 132 is tightened to the shank 131a of the bolt 131, so that the bolt 131 is restrained from rotating. That face of the bus bar connecting part 152 which constitutes the negative electrode side space and which is near the battery lid 102 engages with the head 131b of the bolt 131, thereby preventing the bolt 131 from slipping off. Storing the bolt head 131b of the bolt 131 in the negative electrode side space enables the bus bar 123 to be easily connected to the negative electrode external terminal 105 by use of the bolt 131 and the nut 132.

The process of producing the external terminal will be described below with reference to FIGS. 8 to 14. Although different materials are used for the positive electrode external terminal 104 and the negative electrode external terminal 105, their production processes are the same. The following description hence only refers to the process for producing the negative electrode external terminal 105. For the sake of convenience of description, the vertical direction is defined as shown in FIGS. 9, 10, 12, and 13.

First Pressing Step

This step starts with preparing the rectangular flat material 11a as shown in FIGS. 8(a) and 8(b).

Next, the material 11a is placed on a first lower die 41, and a first upper die 31 is arranged over the material 11a, as shown in FIG. 9(a). The first lower die 41 has a circular recess 41a which is larger in diameter than a circular projection 31a projecting from the first upper die 31.

The material 11a is pressed by pushing down the first upper die 31 as shown in FIG. 9(b). Thus, the first pressing step forms a recess 11b1 and a projection 11b2 respectively in the upper surface and the lower surface of a material 11b.

Second Pressing Step

This step starts with placing the material 11b, which has undergone the first pressing step, on a second lower die 42 and positioning a second upper die 32 over the material 11b, as shown in FIG. 10(a). The second upper die 32 has a projection 32a that can be fitted into the recess 11b1 of the material 11b, and the second lower die 42 has an opening 42b into which the projection 11b2 of the material 11b can be fitted.

The material 11b is placed on the second lower die 42, with the projection 11b2 being fitted into the opening 42b. In the vicinity of the upper periphery of the opening 42b of the lower die 42 is a recess 42a that conforms to the shape of the sealing part 151c mentioned above. On the bottom of the recess 42a are circular grooves 42a1 and 42a2 whose shapes conform respectively to the first projection 151c1 and the second projection 151c2 mentioned above, the circular grooves 42a1 and 42a2 being disposed so as to have a double circle in the plan view.

The step of pushing down the second upper die 32 to compress the material 11b as shown in FIG. 10(b) gives the blanc 11c, which has undergone the second pressing step, the sealing part 151c formed on the periphery of the projection 11b2 as shown in FIGS. 11(a) and 11(b). The sealing part 151c is provided with the first projection 151c1 and the second projections 151c2 having equal thicknesses, or equal dimensions in the vertical direction, to the thickness t0 of the material 11a prior to the pressing step. The pressing step is performed in the vertical direction, so that a thickness at the annular flat part between the first projection 151c1 and the second projection 151c2 and another thickness at the annular flat part between the peripheral surface of the projection 11b2 and the second projection 151c2 become slightly thinner than the thickness t0 of the material 11a prior to the pressing step.

The area excluding the projection 11b2 and the sealing part 151c is compressed in the vertical direction so as to be wholly expanded. The compressed area has a smaller thickness t1 than the thickness t0 of the material 11a prior to the pressing step. (t1<t0).

Forging Step

The forging step shown in FIG. 12(a) consists of placing a material 11c, which has undergone the second pressing step, on a third lower die 43, bringing a third upper die 33 into contact with the upper side of the material 11c, and positioning a fourth upper die 34 over the material 11c. The fourth upper die 34 has a pressing part 34a of a cylindrical shape, and the third upper die 33 has an opening 33a into which the pressing part 34a of the fourth upper die 34 is inserted. The material 11c is held between the third upper die 33 and the third lower die 43. The third lower die 43 includes a groove 43a, having a circular shape in the plan view, which conforms to the shape of the cylindrical end side insertion part 151b2 mentioned above.

When the fourth upper die 34 is pushed down so that the pressing part 34a compresses the recess 11b1 of the material 11c, the material 11c is deformed as shown in FIG. 12(b). The end side insertion part 151b2 as well as the inner recess 151h and outer recess 151g are thereby formed on the material 11d, which has been subjected the forging step, as shown in FIGS. 11(c) and 11(d).

Figure 12:
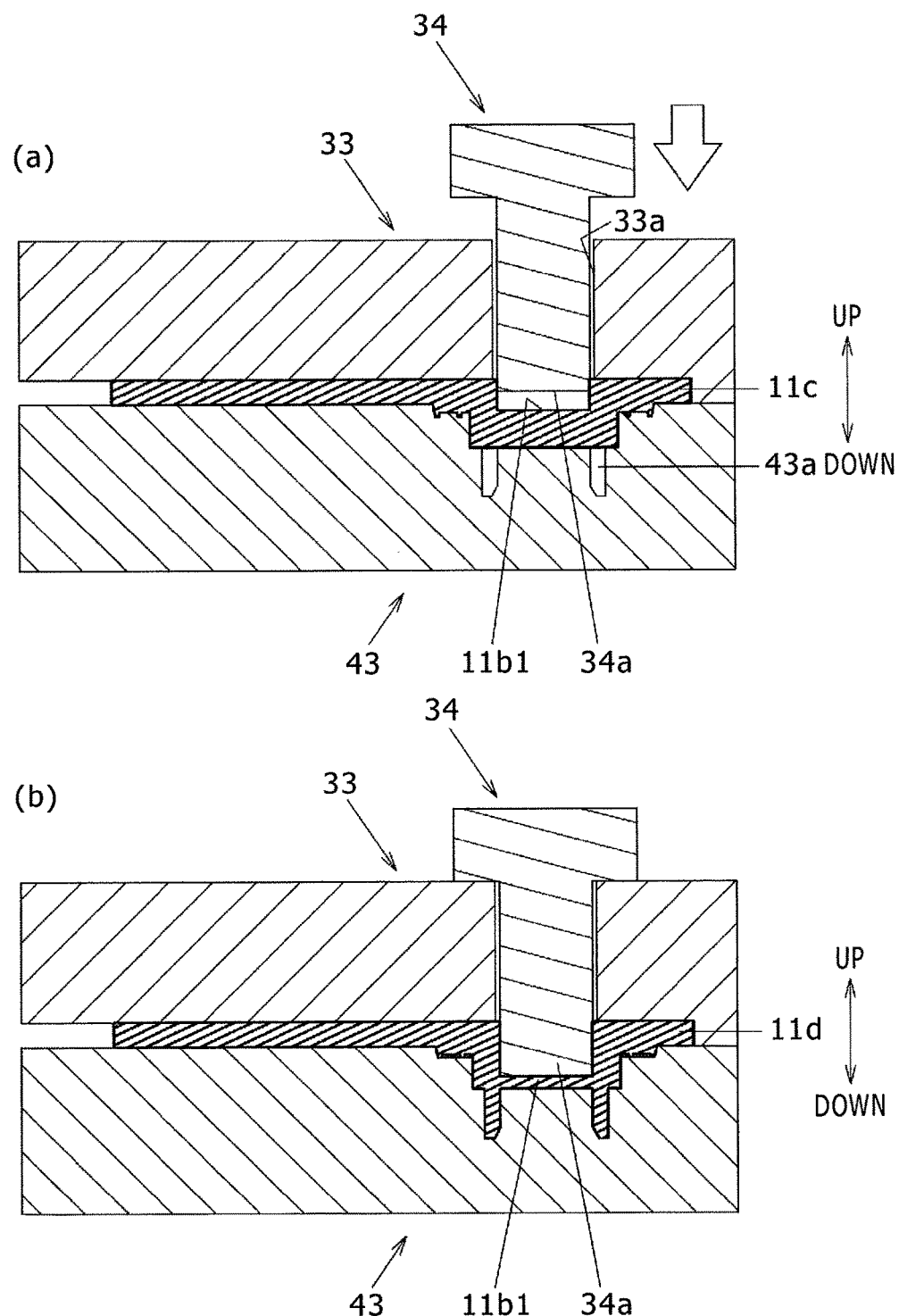
FIGS. 12(a) and 12(b) are diagrams showing the forging step.
Figure 13:
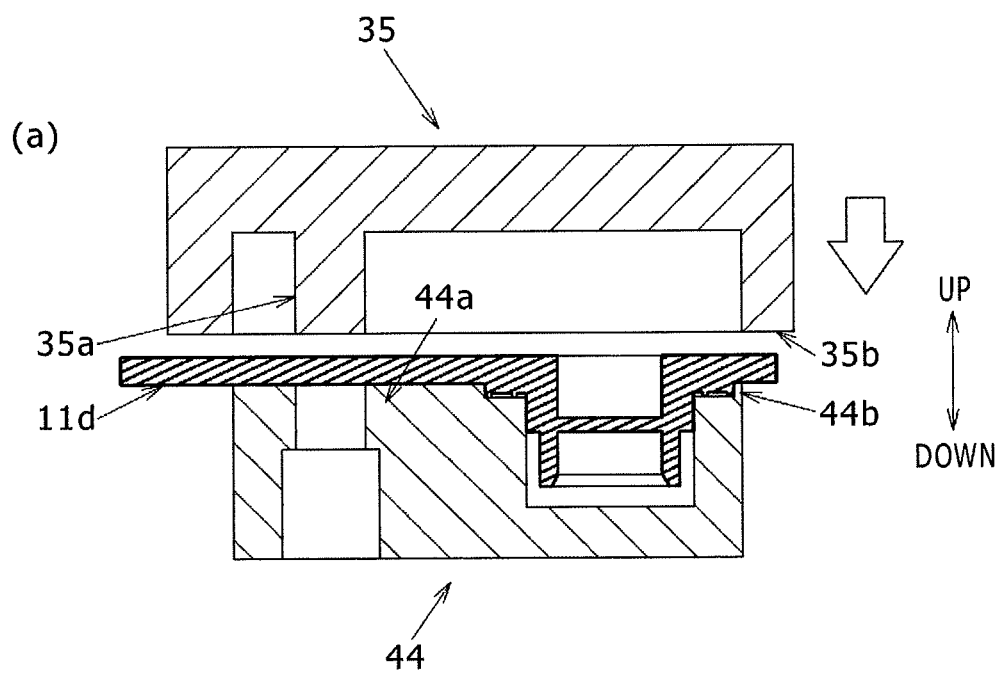
FIGS. 13(a) and 13(b) are diagrams showing the punching step.
Figure 13:
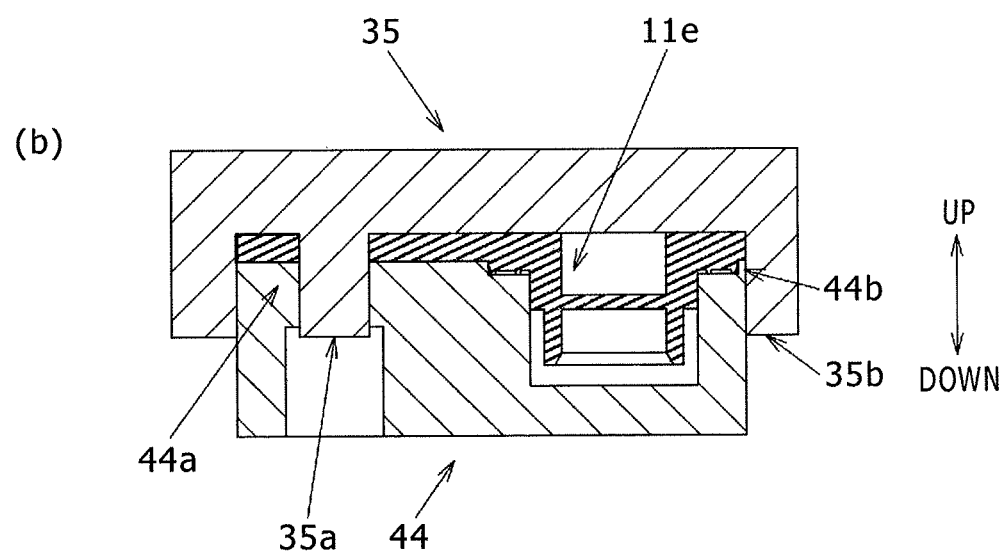
Figure 14:
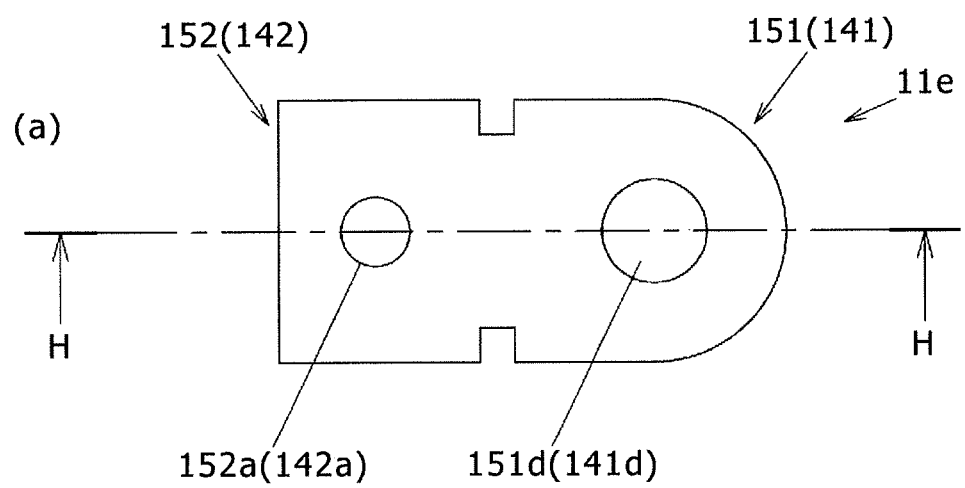
FIGS. 14(a) and 14(b) respectively show a plan view and a side sectional view of the material which has been subjected to the punching step.
Figure 14:
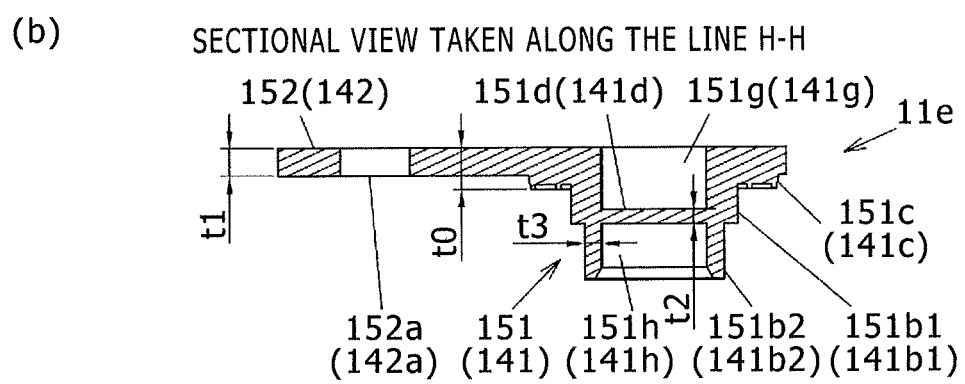

As shown in FIG. 12, the recess 11b1 of the material 11c is compressed by the pressing of pressing part 34a. Moreover, the end side insertion part 151b2 is formed as a result of the bottom material of the recess 11b1 being extruded into the groove 43a. Consequently, as shown in FIG. 11(d), the material 11d after the forging step is formed to have the thickness t2 of the bottom 151d and the thickness t3 of the end side insertion part 151b2 smaller than the thickness t1 of the area excluding the end side insertion part 151b2, the end side insertion part 151b1, and the sealing part 151c (t2<t1, t3<t1).

Punching Step

This step consists of placing the material 11d, which has undergone the forging step, on a fourth lower die 44 and positioning a fifth upper die 35 over the material 11d, as shown in FIG. 13(a). The fifth upper die 35 has a punch 35a to make a hole and a die 35b to define an edge, the punch 35a having a cylindrical shape conforming to the shape of the through hole 152a into which the bolt 131 is inserted, the die 35b having an opening corresponding to the outer shape of the negative electrode external terminal 105. The fourth lower die 44 has a punching die 44a to make a hole and a punch 44b to define an edge, the fourth lower die 44 having an opening into which the punch 35a of the fifth upper die 35 is inserted, the punch 44b corresponding to the outer shape of the negative electrode external terminal 105.

As the fifth upper die 35 is pushed down for punching, a material 11e is formed as shown in FIG. 13(b). The material 11e, which has undergone the punching step, has the through hole 152a formed therein and the outer shape of the negative electrode external terminal 105, as shown in FIGS. 14(a) and 14(b).

Finishing Step

After the punching step, the material 11e is subjected to trimming of its corners and burrs, such that the negative electrode external terminal 105 shown in FIG. 6 is formed.

The negative electrode external terminal 105 accordingly formed is configured to have the thickness t1 of the bus bar connecting part 152 and the thickness t2 of the bottom 151d smaller than the thickness t0 of the sealing part 151c [See FIG. 14(b)].

Incidentally, the positive electrode external terminal 104 is also formed as a result of the first pressing step, the second pressing step, the forging step, and the finishing step, in the same way as above.

Thus, the present embodiment makes it possible to form the external terminals 104 and 105 from a single rectangular flat material by pressing, forging, and punching, thereby simplifying the manufacturing process.

The foregoing embodiment of the present invention produces the following operational advantages.

(1) The external terminals 104 and 105 respectively have the bus bar connecting parts 142 and 152, to which the bus bar 123 is connected, and the current collector connecting parts 141 and 151, to which the current collectors 180 and 190 are connected. The bus bar connecting part 142 and the current collector connecting part 141 are integrally juxtaposed on the battery lid, and the bus bar connecting part 152 and the current collector connecting part 151 are integrally juxtaposed on the battery lid. The current collector connecting parts 141 and 151 respectively have the cylindrical insertion parts 141b and 151b and the sealing parts 141c and 151c, the cylindrical insertion parts 141b and 151b being inserted into the through hole 102h of the battery lid 102, the sealing parts 141c and 151c being for pressing down the flange 169b of the gasket 169 and being provided around the insertion parts 141*b* and 151*b*, the gasket 169 sealing a gap between the through hole 102*h* and the insertion parts 141*b* and 151*b*. The cylindrical insertion parts 141*b* and 151*b* respectively have in their insides the bottoms 141*d* and 151*d* for sealing the through hole 102*h* of the battery lid 102. The ends of the insertion parts 141*b* and 151*b* are staked respectively to the current collectors 180 and 190. The external terminals 104 and 105 are electrically connected to the respective electrodes 174 and 175 of the wound electrodes 170 via the current collectors 180 and 190.

The secondary battery disclosed in Patent Document 1 has a terminal block and a rivet terminal for connection to the current collecting connector, the terminal block being connected to the current collecting connector via the rivet terminal. Consequently, the secondary battery disclosed in Patent Document 1 needs a large number of parts and connections in the current passage. By contrast, the secondary battery according to the embodiment is simple in structure, requiring less parts than the one disclosed in Patent Document 1 does because the external terminals 104 and 105 are connected respectively to the current collectors 180 and 190 directly. Moreover, the secondary battery according to the embodiment has a smaller contact resistance than the one disclosed in Patent Document 1.

(2) The secondary battery disclosed in Patent Document 1 needs complex manufacturing processes because the terminal block and current collecting connector are connected to the rivet terminals by means of staking and welding. In contrast, the secondary battery according to the embodiment is structured such that the current collector connectors 141 and 151 of the external terminals 104 and 105 are connected to the positive and negative current collectors 180 and 190. This structure saves the number of connections with staking and welding as compared with the one according to the conventional technology disclosed in Patent Document 1. Incidentally, each of the external terminals 104 and 105 can be easily formed from a single rectangular flat material by pressing and forging. Therefore, the technology according to the embodiment makes it possible to produce the square secondary battery 100 with a less number of steps in better throughput yields than the one disclosed in Patent Document 1 does, which leads to a cost reduction.

(3) The fact that the positive electrode insertion part 141*b* and negative electrode insertion part 151*b* respectively have the outer recesses (141*g*, 151*g*) and the inner recesses (141*h*, 151*h*) enables easy and accurate positioning of the die for the staking machine.

The scope of the present invention also covers the following modifications. One or more than one of such modifications may be combined with the foregoing embodiment.

(1) The foregoing embodiment is concerned with the structure in which the head 131*b* of the bolt 131 is stored in the positive electrode side space and the negative electrode side space. This structure may be modified such that the head 131*b* of the bolt 131 is replaced by the nut 132.

(2) The foregoing embodiment was explained with the example in which the bus bar 123 is fastened to the positive and negative external terminals 104 and 105 by screwing with the bolt 131 and the nut 132, as shown in FIG. 5(*c*). The scope of the present invention is not restricted to this structure. The bus bar 123 may be connected to the bus bar connecting parts 142 and 152 by means of laser welding. Incidentally, in this case, it is not necessary to form the through holes 142*a* and 152*a* in the bus bar connecting parts 142 and 152.

(3) The method of producing the external terminals 104 and 105 is not restricted to the one according to the foregoing embodiment. Incidentally, it is desirable to form the external terminals 104 and 105 in such a manner that the thickness t2 of the bottom 141*d* and 151*d* will be smaller than the thickness t0 of the sealing part 141*c* and 151*c*. It is also desirable to form the external terminals 104 and 105 such that the thickness t1 of the bus bar connecting part 142 is smaller than the thickness t0 of the sealing part 141*c* and 151*c*.

(4) The positive electrode external terminal 104, the positive electrode current collector 180, and the positive electrode foil 171 may be produced from any other materials than aluminum; the material instead may be aluminum alloy. The negative electrode external terminal 105 and the negative electrode current collector 190 may be produced from any other materials than copper alloy; the material instead may be copper. The negative electrode foil 172 may be formed from any other materials than copper; the material instead may be copper alloy.

(5) In the foregoing embodiment, the lithium ion secondary battery has been explained as an example of the square secondary batteries that constitute a battery pack. However, the present invention may be applied to a variety of square batteries holding electric power storage elements, such as nickel-hydrogen batteries, in the battery container.

The scope of the present invention is not restricted to the embodiment and modifications thereof which have been described above. The present invention covers any other conceivable embodiments based on the technical idea of the present invention.

The invention claimed is:

1. A square secondary battery comprising:
   a generating element having an electrode;
   a battery can holding the generating element;
   a battery lid that seals an opening of the battery can;
   a unitary terminal arranged on the battery lid made of a single piece of selectively shaped electrically conductive material for providing an electrical connection between an internal terminal within the battery can and an external terminal outside of the battery can having a first end disposed at a through hole of the battery lid configured to define the internal terminal and a second end configured to define the external terminal at a position laterally displaced from the through hole of the battery lid;
   the unitary terminal configured such that the first end of the single piece of selectively shaped conductive material extends through the battery lid via the through hole; and
   the current collector electrically coupled to internal terminal of the first end of the unitary terminal by a current collector joint and connecting the electrode of the generating element to the unitary terminal within the battery can,
   the unitary terminal has the external terminal of the second end of the single piece of selectively shaped conductive material configured as a bus bar contact area above the battery lid to which a bus bar can be electrically connected at the position laterally displace from the through hole,
   the first end of the single piece of selectively shaped conductive material of the unitary terminal having a sealing part arranged at an outer periphery of the through hole, the sealing part pressing down on the battery lid via a sealing member thereby sealing the through hole, and the first end of the single piece of selectively shaped conductive material of the unitary terminal having a closed ended cylindrical insertion part that extends through the through hole which is staked to the current collector to form the current collector joint.

2. The square secondary battery according to claim 1, wherein the closed end of the cylindrical insertion part is thinner than the sealing part.

3. The square secondary battery according to claim 1, wherein the bus bar contact area is thinner than the sealing part.

4. The square secondary battery according to claim 1, wherein the bus bar contact area has a through hole into which is inserted a bolt for coupling a bus bar to the bus bar contact area of the unitary terminal.

* * * * *